US012510816B2

(12) United States Patent
Chen et al.

(10) Patent No.: US 12,510,816 B2
(45) Date of Patent: Dec. 30, 2025

(54) PROJECTION SYSTEM AND CONTROL METHOD

(71) Applicant: Coretronic Corporation, Hsin-Chu (TW)

(72) Inventors: Kun-Hong Chen, Hsin-Chu (TW); Yu-Hsuan Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 459 days.

(21) Appl. No.: 18/169,866

(22) Filed: Feb. 15, 2023

(65) Prior Publication Data

US 2023/0273512 A1 Aug. 31, 2023

(30) Foreign Application Priority Data

Feb. 25, 2022 (CN) ........................ 202210176646.X

(51) Int. Cl.

*G03B 21/14* (2006.01)
*G03B 21/20* (2006.01)
*G06T 7/11* (2017.01)
*H04N 9/31* (2006.01)

(52) U.S. Cl.

CPC ....... *G03B 21/206* (2013.01); *G03B 21/2053* (2013.01); *G06T 7/11* (2017.01); *G06T 2207/10004* (2013.01)

(58) Field of Classification Search

CPC .. G03B 21/206; G03B 21/2053; G03B 21/14; G03B 21/147; H04N 9/3194; H04N 9/3179; G06T 7/11

See application file for complete search history.

(56) References Cited

U.S. PATENT DOCUMENTS 8,290,208 B2 10/2012 Kurtz et al.
8,733,951 B2 * 5/2014 Gruen ...................... H04N 9/75 353/97
9,028,072 B2 5/2015 Chang et al.
2004/0165154 A1 8/2004 Kobori et al.
(Continued)

FOREIGN PATENT DOCUMENTS

CN 1523439 8/2004
CN 107749979 3/2018
(Continued)

OTHER PUBLICATIONS

Po-Yen Wu, “Projection System and Control Method Thereof”, Unpublished U.S. Appl. No. 17/969,672, filed Oct. 19, 2022.

*Primary Examiner* — Ryan D Howard
(74) *Attorney, Agent, or Firm* — JCIPRNET

(57) ABSTRACT

A projection system and a control method are provided. The control method includes the following. A projected image is projected on a projection area by a projection device. The projected image is captured in a detection area to generate a captured image by an image capturing device. The detection area includes the projection area. The captured image is received, a virtual frame is generated around the captured projection area in the captured image, and pixel values of the virtual frame are analyzed to determine whether an object enters the projection area by a processing device. The projection device is controlled to perform a protection operation by the processing device in response to determining that the object enters the projection area.

17 Claims, 5 Drawing Sheets

(56) References Cited

U.S. PATENT DOCUMENTS

| | | | |
|---|---|---|---|
| 2007/0099700 | A1 | 5/2007 | Solomon et al. |
| 2009/0147224 | A1 | 6/2009 | Kurozuka et al. |
| 2010/0177929 | A1 | 7/2010 | Kurtz et al. |
| 2013/0169164 | A1 | 7/2013 | Shen et al. |
| 2017/0201731 | A1 | 7/2017 | Brown et al. |

FOREIGN PATENT DOCUMENTS

| | | |
|---|---|---|
| CN | 213279945 | 5/2021 |
| TW | 201112198 | 4/2011 |
| TW | 201227149 | 7/2012 |
| TW | 201611616 | 3/2016 |

* cited by examiner

PROJECTION SYSTEM AND CONTROL METHOD

CROSS-REFERENCE TO RELATED APPLICATION

This application claims the priority benefit of Chinese application no. 202210176646.X, filed on Feb. 25, 2022. The entirety of the above-mentioned patent application is hereby incorporated by reference herein and made a part of this specification.

BACKGROUND

Technical Field

The disclosure relates to a projection system and a control method.

Description of Related Art

Benefiting from rapid development of optical technology, brightness of a current projection system has been greatly improved regardless of whether it uses a light bulb, a laser, or a light-emitting diode (LED) as a light source. However, the increase in the brightness of the light source results in the increase in the likelihood of damaging eyesight of a user by the projection system.

A protection mechanism adopted by current commercially available projection systems generally falls with the case where an infrared sensor or a time of flight (ToF) sensor forms a grating to sense whether an object enters a specific range, so as to activate the protection mechanism. However, some issues are there in the above-mentioned case. For example, if an excessively low density of the grating is caused by an excessively small number of sensors that are disposed, the grating may not be able to detect relatively small objects such as children, pets, or the like. If an excessively large number of sensors are disposed, it may cause an excessively large number of erroneous judgment alarms and increase production cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection system and a control method, in which a captured image obtained by an image capturing device can be analyzed to determine whether to perform a protection operation of a projection device.

The disclosure provides a projection system including a projection device, an image capturing device, and a processing device. The projection device is configured to project a projected image on a projection area. The image capturing device is configured to capture the projected image in a detection area to generate a captured image, where the detection area includes the projection area. The processing device is coupled to the projection device and the image capturing device, where the processing device receives the captured image, and the processing device is configured to generate a virtual frame around the projection area in the captured image, and analyze pixel values of the virtual frame to determine whether an object enters the projection area, where the processing device controls the projection device to perform a protection operation in response to determining that the object enters the projection area.

In an embodiment of the disclosure, the protection operation includes at least one of the following: stopping projecting the projected image, reducing a brightness of the projected image, moving the projected image, scaling down the projected image, and pausing the projected image.

In an embodiment of the disclosure, the virtual frame includes a first region of interest and a second region of interest, where the processing device compares a first pixel value of the first region of interest with a second pixel value of the second region of interest to generate a comparison result, and determines whether the object enters the projection area according to the comparison result.

In an embodiment of the disclosure, the processing device determines that the object enters the projection area in response to the comparison result being greater than a threshold.

In an embodiment of the disclosure, the comparison result is a ratio between the first pixel value and the second pixel value.

In an embodiment of the disclosure, the processing device determines the threshold according to a brightness of the captured image.

In an embodiment of the disclosure, the threshold is inversely proportional to the brightness.

In an embodiment of the disclosure, the processing device normalizes an initial comparison result of the first pixel value and the second pixel value to configure the virtual frame.

In an embodiment of the disclosure, the projection device projects a correction pattern on the detection area, where the processing device detects the correction pattern through the imaging capturing device to obtain position information corresponding to the projection area, and configures the virtual frame according to the position information.

In an embodiment of the disclosure, the virtual frame includes a plurality of regions of interest surrounding the projected image, where the plurality of regions of interest include the first region of interest and the second region of interest adjacent to the first region of interest.

In an embodiment of the disclosure, the processing device detects the object to generate an object frame on the detection area, and determines that the object enters the projection area in response to overlapping of the object frame and the virtual frame.

In an embodiment of the disclosure, the object frame corresponds to a head portion of the object.

In an embodiment of the disclosure, the processing device stops performing the protection operation in response to determining that the object leaves the projection area.

In an embodiment of the disclosure, the projection device generates a monochromatic image in the projection area in response to performing the protection operation, where the processing device generates a second virtual frame on the projection area, and compares pixel values of the second virtual frame to determine whether the object leaves the projection area.

In an embodiment of the disclosure, the second virtual frame includes a first region of interest and a second region of interest, where the processing device compares a first pixel value of the first region of interest with a second pixel value of the second region of interest to generate a comparison result, and determines whether the object leaves the projection area according to the comparison result.

The disclosure provides a control method of a projection system. The projection system includes a projection device, an image capturing device, and a processing device. The control method includes the following. A projected image is projected on a projection area by the projection device. The projected image is captured in a detection area to generate a captured image by the image capturing device. The detection area includes the projection area. The captured image is received, a virtual frame is generated around the projection area in the captured image, and pixel values of the virtual frame are analyzed to determine whether an object enters the projection area by the processing device. The projection device is controlled to perform a protection operation by the processing device in response to determining that the object enters the projection area.

In an embodiment of the disclosure, the protection operation includes at least one of the following: stopping projecting the projected image, reducing a brightness of the projected image, moving the projected image, scaling down the projected image, and pausing the projected image.

Based on the above description, the projection system of the disclosure may determine whether the object enters the projection area by analyzing the pixel values of the captured image obtained by the image capturing device, and perform a protection operation when the object enters the projection area to prevent the light generated by the projection device from affecting eyesight of the object to cause damages.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
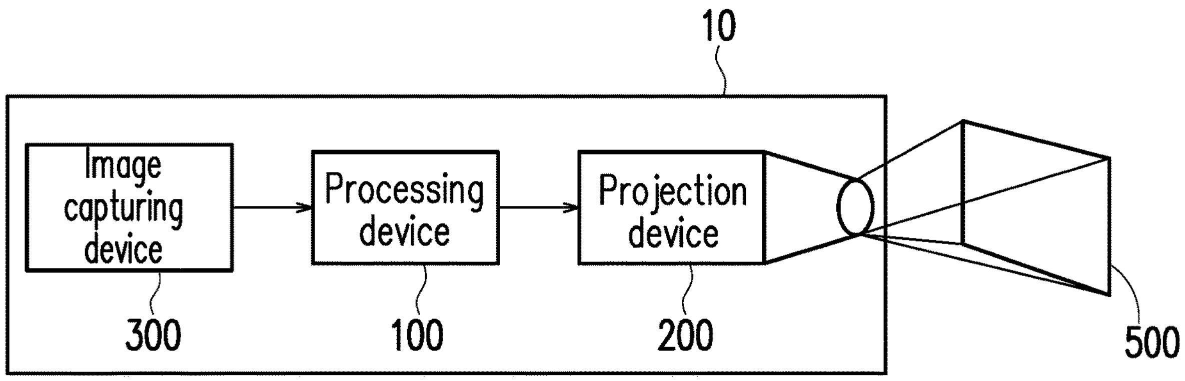
FIG. 1 is a schematic diagram of a projection system according to an embodiment of the disclosure.

FIG. 1 is a schematic diagram of a projection system 10 according to an embodiment of the disclosure. The projection system 10 is used to project a projected image on a projection area 500. The projection system 10 may perform a protection operation that prevents light generated by the projection system 10 from causing damage to eyesight of a person or pet. The projection system 10 may include a processing device 100, a projection device 200 and an image capturing device 300. The processing device 100 may control the projection device 200 and the image capturing device 300 to perform various functions of the projection device 200 and the image capturing device 300.

The processing device 100 is, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable logic gate array (FPGA) or other similar devices or a combination of the above devices. The processing device 100 may be coupled to the projection device 200 and may control the projection device 200 to project a projected image. The processing device 100 may be coupled to the image capturing device 300 and may obtain a captured image through the image capturing device 300. In an embodiment, the processing device 100 may continuously obtain the captured image through the image capturing device 300 after each certain period of time.

Figure 2:
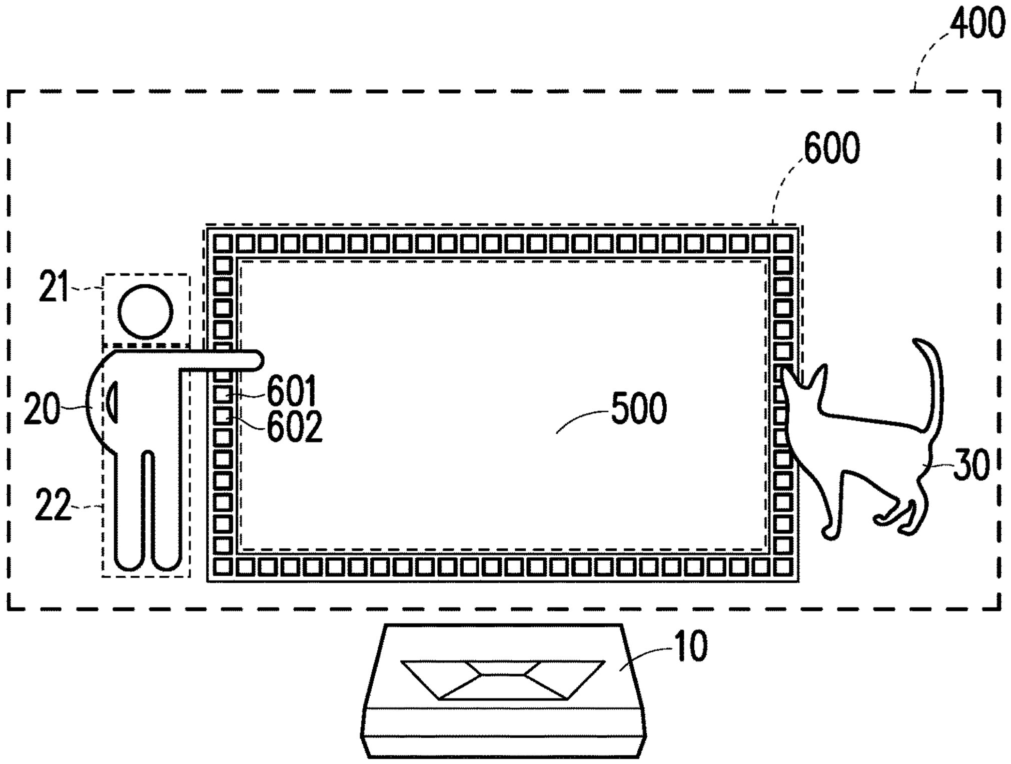
FIG. 2 is a schematic diagram of a virtual frame according to an embodiment of the disclosure.

FIG. 2 is a schematic diagram of a virtual frame 600 according to an embodiment of the disclosure. The processing device 100 may control the projection device 200 to project the projected image on the projection area 500, and may capture the projected image in a detection area 400 through the image capturing device 300 to generate a captured image, where the detection area 400 may include the projection area 500. The processing device 100 may receive the captured image from the image capturing device 300. The processing device 100 may generate the virtual frame 600 around the projection area 500 in the captured image, and determine whether an object (for example, a person 20 or a pet 30) enters the projection area 500 according to the virtual frame 600. If the processing device 100 determines that the object enters the projection area 500, the processing device 100 may control the projection device 200 according to the determination result, and the projection device 200 performs a protection operation. The protection operation includes, for example, stopping projecting the projected image, reducing a brightness of the projected image, moving the projected image or moving the projection area 500, scaling down the projected image or pausing the projected image, etc., but the disclosure is not limited thereto.

In an embodiment, the processing device 100 may determine whether the object enters the projection area 500 according to an object detection technology or a machine learning model. Specifically, the processing device 100 may detect a moving object on the detection area 400 according to the captured image to generate an object frame (for example, an object frame 21). If the object frame is overlapped with the virtual frame 600, the processing device 100 may determine that an object enters the projection area 500. The object frame, for example, corresponds to a head portion of the detected object. In an embodiment, the processing device 100 determines that the object enters the projection area 500 and performs the protection operation only when the object frame corresponding to the head portion is overlapped with the virtual frame 600.

For example, when the processing device 100 detects the person 20, the processing device 100 may generate the object frame 21 corresponding to the head portion of the person 20 and an object frame 22 corresponding to a body portion of the person 20. When the object frame 21 is overlapped with the virtual frame 600, it represents that the head portion of the person 20 has entered the projection area 500. Accordingly, the processing device 100 may perform the protection operation of the projection device 200 to prevent excessive light from irradiating the head portion of the person 20. Comparatively, if only the object frame 22 is overlapped with the virtual frame 600 and the object frame 21 is not overlapped with the virtual frame 600, it represents that only the body portion (for example, a hand) of the person 20 enters the projection area 500, and the head portion of the person 20 does not enter the projection area 500. Since the light generated by the projection device 200 will not cause harm to the body portion of the person 20, the processing device 100 may not perform the protection operation of the projection device 200.

It should be noted that when the object frame 21 enters the projection area 500, regardless of whether a face portion of the person 20 faces the projection device 200 or faces away from the projection device 200, the light generated by the projection device 200 may directly or indirectly irradiate the face portion of the person 20. For example, when the face portion of the person 20 faces away from the projection device 200, the light generated by the projection device 200 may irradiate the face portion of the person 20 through reflection. Therefore, regardless of whether the face portion of the person 20 faces the projection device 200 or faces away from the projection device 200, the processing device 100 may decide to perform the protection operation of the projection device 200. Based on the above, an object detection function of the processing device 100 only needs to be sufficient to recognize the head portion of the person 20, and does not need to have the function of recognizing facial features.

In an embodiment, the processing device 100 may analyze pixel values of the virtual frame 600 to determine whether the object enters the proj ection area 500. Specifically, the virtual frame 600 may include a plurality of regions of interest (ROI) surrounding the projected image or the projection area 500, where the plurality of regions of interest may include a region of interest 601 and a region of interest 602 adjacent to the region of interest 601. The processing device 100 may compare pixel values of the region of interest 601 and the region of interest 602 to generate a comparison result, and determine whether the object enters the projection area 500 according to the comparison result.

Figure 3:
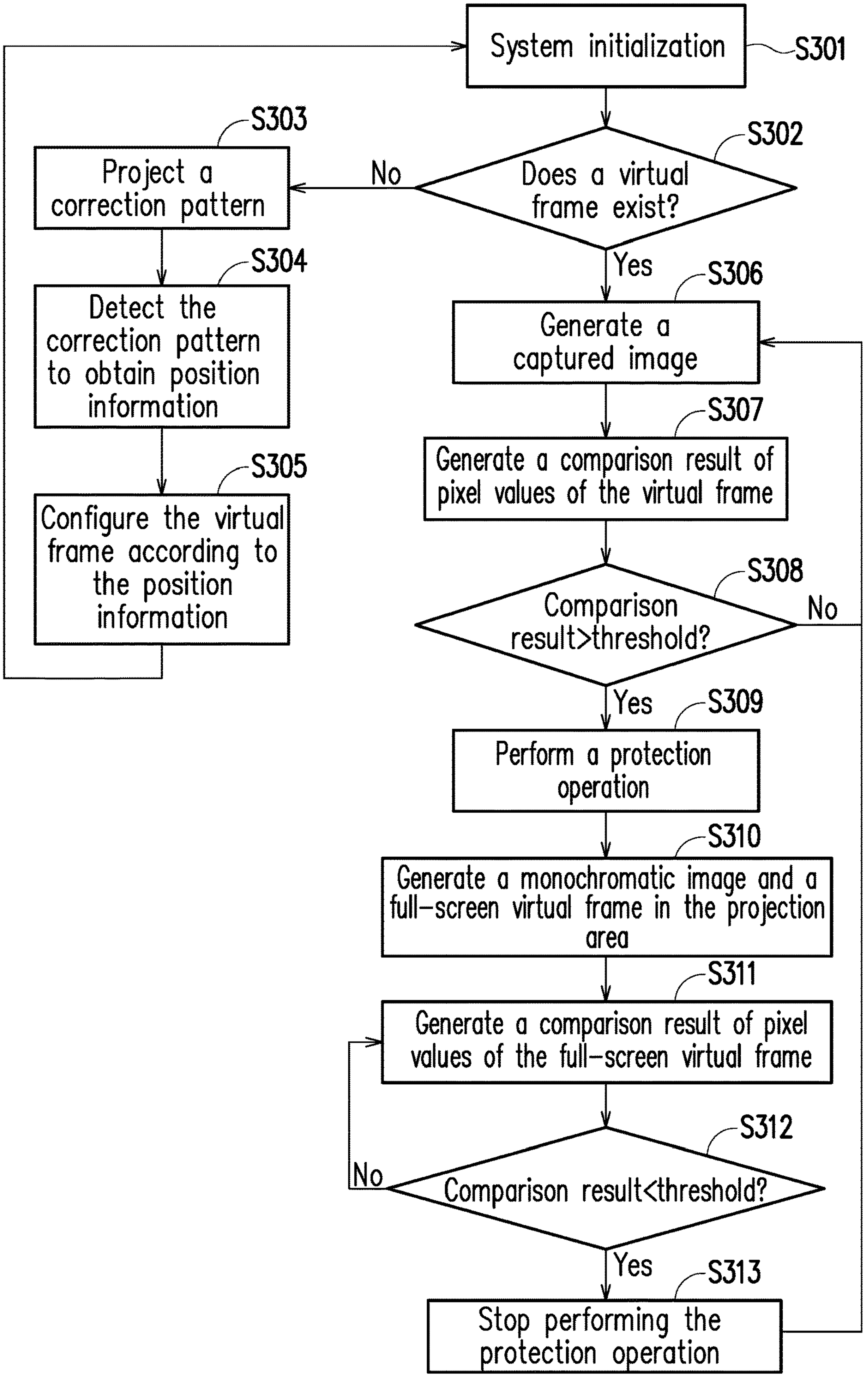
FIG. 3 is a flowchart of controlling a projection device based on pixel values of the virtual frame according to an embodiment of the disclosure.

FIG. 3 is a flowchart of controlling the projection device 200 based on pixel values of the virtual frame 600 according to an embodiment of the disclosure. In step S301, the processing device 100 may perform system initialization. For example, the processing device 100 may set a projection configuration for the projection device 200, where the projection configuration may be associated with parameters such as the projection area 500, a brightness, a contrast, or a color gamut of the projection device 200. In an embodiment, the processing device 100 may detect an environmental light source of the projection system 10 through the image capturing device 300, and configure the projection device 200 according to the environmental light source. For example, the processing device 100 may increase the brightness of the projection device 200 when the environmental light source is brighter, so as to prevent the user from seeing the projected image unclearly.

In step S302, the processing device 100 may determine whether the virtual frame 600 has been generated around the projection area 500. If the virtual frame 600 exists around the projection area 500, the process proceeds to step S306. If there is no virtual frame 600 around the projection area 500, the process proceeds to step S303.

Figure 4A:
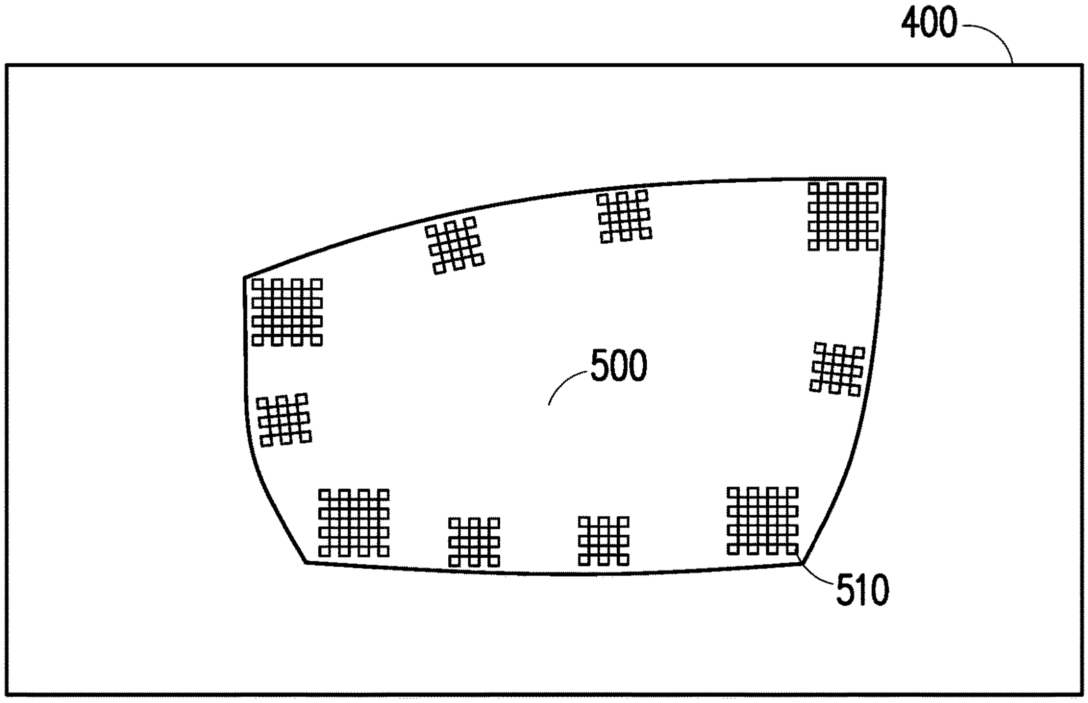
FIG. 4A and FIG. 4B are schematic diagrams of generating the virtual frame according to an embodiment of the disclosure.
Figure 4B:
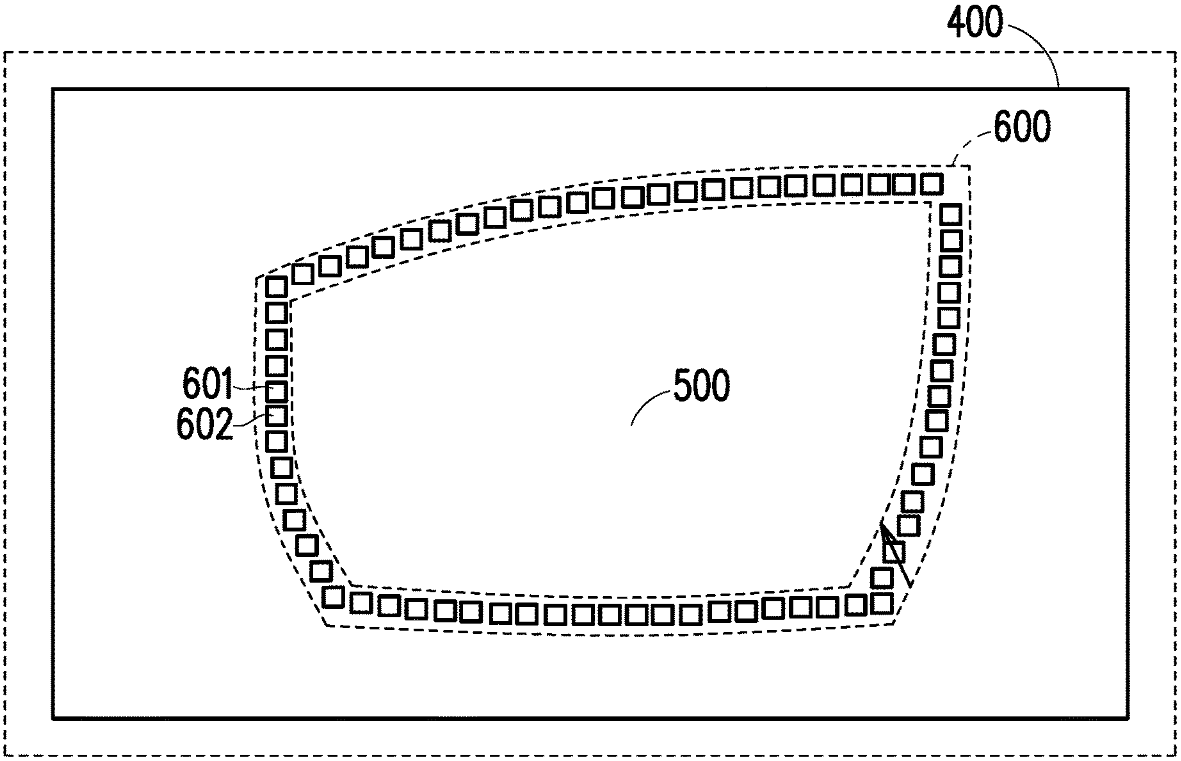

In step S303, the projection device 200 may project a correction pattern on the detection area 400. FIG. 4A and FIG. 4B are schematic diagrams of generating the virtual frame 600 according to an embodiment of the disclosure. Referring to FIG. 4A, the projection device 200 may project one or more correction patterns 510 on the detection area 400, and the correction patterns 510 are, for example, composed of black and white grids arranged in interleaving. It should be noted that although the plurality of correction patterns 510 in FIG. 4A are only distributed on the periphery of the projection area 500, the disclosure is not limited thereto. For example, the plurality of correction patterns 510 may be spread over the entire projection area 500.

In step S304, the processing device 100 may detect the correction patterns 510 through the image capturing device 300 to obtain position information corresponding to the projection area 500. In step S305, the processing device 100 may configure the virtual frame 600 according to the position information of the projection area 500. Referring to FIG. 4B, after obtaining the position information of the projection area 500, the processing device 100 may create the virtual frame 600 around the projection area 500 according to the position information. The virtual frame 600 may include a plurality of regions of interest surrounding the projection area 500, such as the region of interest 601 and the region of interest 602 adjacent to the region of interest 601.

In step S306, the image capturing device 300 may capture the projected image projected on the projection area 500 by the projection device 200 within the detection area 400 to generate a captured image. The processing device 100 may receive the captured image from the image capturing device 300.

In step S307, the processing device 100 may generate a comparison result corresponding to the pixel values of the virtual frame 600 according to the captured image. Specifically, the virtual frame 600 may include a plurality of regions of interest surrounding the projection area 500, where the plurality of regions of interest may include the region of interest 601 and the region of interest 602 adjacent to the region of interest 601. The processing device 100 may compare a pixel value of the region of interest 601 with a pixel value of the region of interest 602 to generate a comparison result, where the comparison result is, for example, a ratio between the pixel value of the region of interest 601 and the pixel value of the region of interest 602.

In step S308, the processing device 100 may determine whether the comparison result is greater than a threshold. If the comparison result is greater than the threshold, the process proceeds to step S309. If the comparison result is less than or equal to the threshold, the process proceeds to step S306. If the comparison result is greater than the threshold, it represents that an object may probably enter one of the region of interest 601 and the region of interest 602, resulting in a significant contrast between the region of interest 601 and the region of interest 602. Therefore, the processing device 100 may determine that an object enters the projection area 500.

The environmental light source may affect the comparison result of the pixel values generated by the processing device 100, resulting in a fact that the processing device 100 cannot correctly determine whether an object enters the projection area 500 according to the comparison result of the pixel values. For example, when the environmental light source becomes brighter, the ratio between the pixel value of the region of interest 601 and the pixel value of the region of interest 602 may be decreased as the environmental light source becomes brighter, resulting in a fact that the processing device 100 cannot detect that the object enters the projection area 500. In order to solve the above problem, in an embodiment, the processing device 100 may determine the threshold according to the brightness of the captured image, where the threshold may be inversely proportional to the brightness of the captured image.

It should be noted that the projection device 200 is assumed to project the projected image onto a plane, a background of the plane may affect the ratio of pixel values to cause wrong judgment. In order to reduce the probability of wrong judgment, in an embodiment, the processing device 100 may normalize the pixel values of the regions of interest in the virtual frame 600 after generating the virtual frame 600. The processing device 100 may normalize an initial comparison result between the pixel value of the region of interest 601 and the pixel value of the region of interest 602 to configure the virtual frame 600. For example, the processing device 100 may set the ratio between the pixel value of the region of interest 601 and the pixel value of the region of interest 602 to "1" to configure the virtual frame 600.

Figure 5:
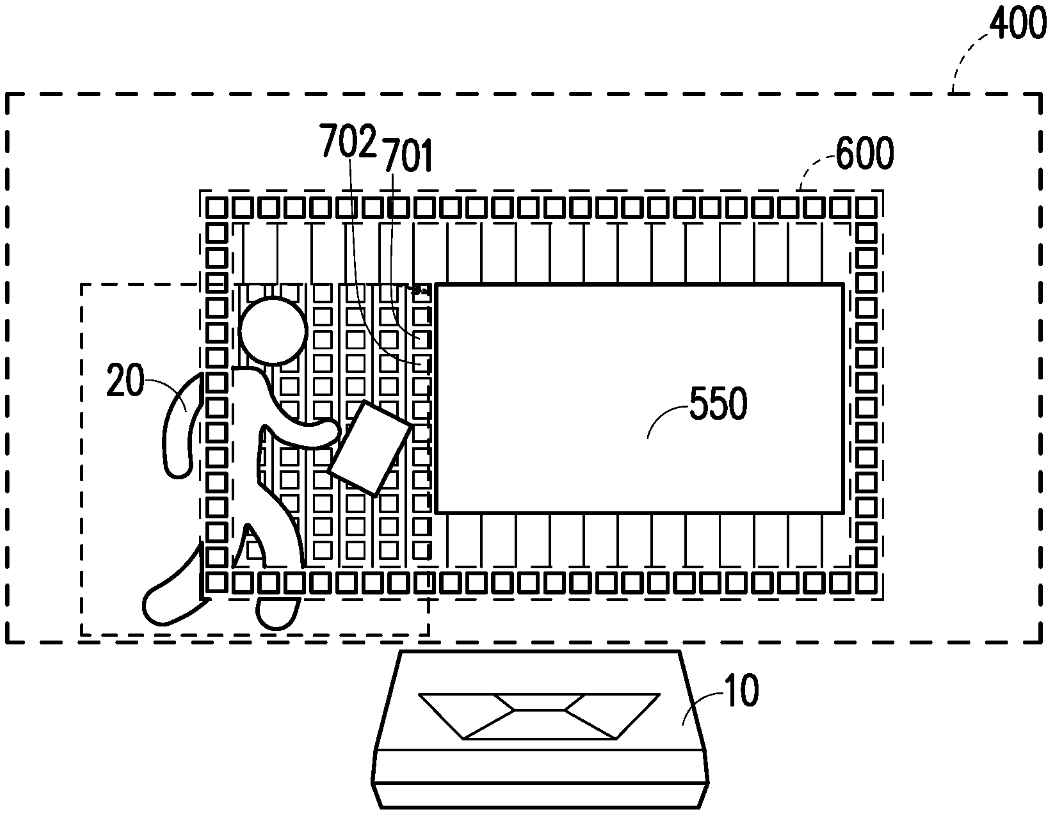
FIG. 5 is an example of a protection operation of the projection device according to an embodiment of the disclosure.

In step S309, the processing device 100 may control the projection device 200 to perform a protection operation. The protection operation includes, for example, stopping projecting the projected image, reducing the brightness of the projected image, moving the projected image or moving the projection area 500, scaling down the projected image, or pausing the projected image. FIG. 5 is an example of a protection operation of the projection device 200 according to an embodiment of the disclosure. When performing the protection operation, the projection device 200 may scale down and move the projected image to generate a projection area 550, so as to prevent the projected image from irradiating the person 20 entering the virtual frame 600.

After the person 20 enters the original projection area 500, the projection system 10 may start comparing the pixel values in the projection area 500 to determine whether the person leaves the projection area 500. However, performing the protection operation may probably cause reduction of the brightness of the captured image obtained by the image capturing device 300, so that the processing device 100 cannot detect accurate pixel values. Therefore, in step S310, the projection device 200 may generate a monochromatic image (for example, white light) in the projection area 500 in response to performing the protection operation, and generate a full-screen virtual frame in the projection area 500. The full-screen virtual frame may include, for example, a plurality of regions of interest surrounding the projection area 550, such as a region of interest 701 and a region of interest 702 adjacent to the region of interest 701. The projection device 200 may illuminate a monochromatic image around the projection area 550 to supplement light to the plurality of regions of interest, so that the processing device 100 may accurately detect the pixel value of each region of interest.

In step S311, the processing device 100 may capture the projected image projected by the projection device 200 through the image capturing device 300 to generate a captured image, and may generate a comparison result corresponding to the pixel values of the full-screen virtual frame according to the captured image. Specifically, taking the region of interest 701 and the region of interest 702 as an example, the processing device 100 may compare the pixel value of the region of interest 701 and the pixel value of the region of interest 702 to generate a comparison result, where the comparison result is, for example, a ratio between the pixel value of the region of interest 701 and the pixel value of the region of interest 702.

In step S312, the processing device 100 may determine whether the comparison result is smaller than a threshold, where the threshold in step S312 and the threshold in step S308 may be the same or different. If the comparison result is smaller than the threshold, the process proceeds to step S313. If the comparison result is greater than or equal to the threshold, the process proceeds to step S311. If the comparison result is less than the threshold, it represents that the object originally entered the projection area 500 has left the projection area 500, resulting in a decrease in the contrast between the region of interest 701 and the region of interest 702. Therefore, the processing device 100 may determine that the object has left the projection area 500.

In step S313, the processing device 100 may control the projection device 200 to stop performing the protection operation.

Figure 6:
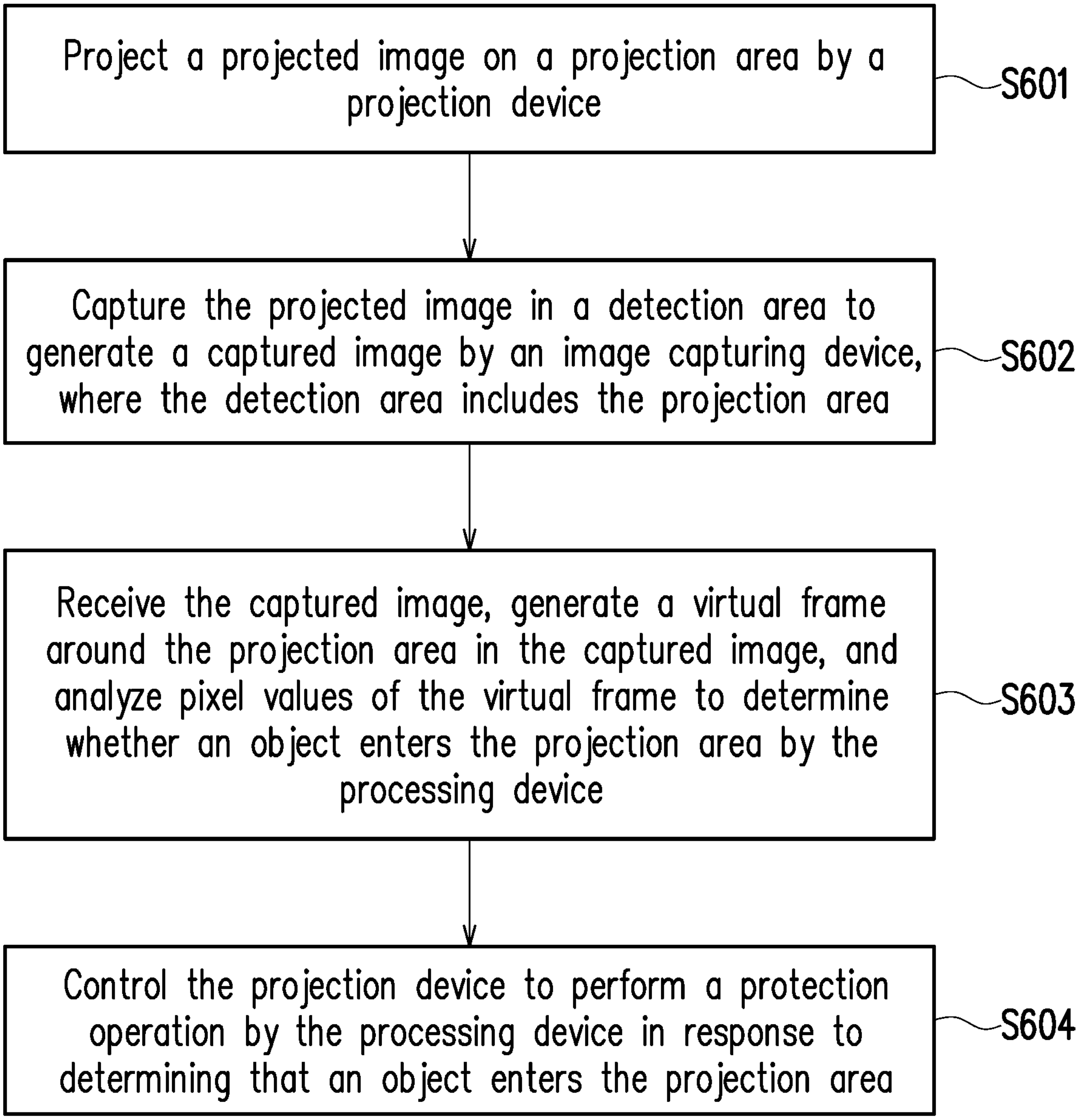
FIG. 6 is a flowchart illustrating a control method of a projection system according to an embodiment of the disclosure.

FIG. 6 is a flowchart illustrating a control method of a projection system according to an embodiment of the disclosure, where the control method may be implemented by the projection system 10 shown in FIG. 1. In step S601, a projected image is projected on a projection area by a projection device. In step S602, the projected image is captured in a detection area to generate a captured image by an image capturing device, where the detection area includes the projection area. In step S603, the captured image is received, a virtual frame is generated around the projection area in the captured image, and pixel values of the virtual frame are analyzed to determine whether an object enters the projection area by a processing device. In step S604, the projection device is controlled to perform a protection operation by the processing device in response to determining that the object enters the projection area.

In summary, the disclosure may create the virtual frame around the projection area, and determine whether an object enters the projection area by analyzing the pixel values of the virtual frame. The above object detection technology does not require a high-resolution image capturing device, so that the production cost may be saved. If it is detected that the object enters the projection area, the projection device may perform a protection operation to prevent the light generated by the projection device from causing damage to the eyesight of the object. When the protection operation is performed, the projected image may still be played, so as to avoid affecting other users to view the projected image. The projection device may use the full-screen virtual frame to detect whether the object leaves the projection area, so as to determine whether to stop performing the protection operation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:

a projection device, configured to project a projected image on a projection area;

an image capturing device, configured to capture the projected image in a detection area to generate a captured image, wherein the detection area comprises the projection area; and a processing device, coupled to the projection device and the image capturing device, wherein the processing device receives the captured image, and the processing device is configured to generate a virtual frame around a captured projection area in the captured image, and analyze pixel values of the virtual frame to determine whether an object enters the projection area, wherein the processing device controls the projection device to perform a protection operation in response to determining that the object enters the projection area.

2. The projection system according to claim 1, wherein the protection operation comprises at least one of: stopping projecting the projected image, reducing a brightness of the projected image, moving the projected image, scaling down the projected image, and pausing the projected image.

3. The projection system according to claim 1, wherein the virtual frame comprises a first region of interest and a second region of interest, wherein the processing device compares a first pixel value of the first region of interest with a second pixel value of the second region of interest to generate a comparison result, and determines whether the object enters the projection area according to the comparison result.

4. The projection system according to claim 3, wherein the processing device determines that the object enters the projection area in response to the comparison result being greater than a threshold.

5. The projection system according to claim 4, wherein the comparison result is a ratio between the first pixel value and the second pixel value.

6. The projection system according to claim 4, wherein the processing device determines the threshold according to a brightness of the captured image.

7. The projection system according to claim 6, wherein the threshold is inversely proportional to the brightness.

8. The projection system according to claim 3, wherein the processing device normalizes an initial comparison result of the first pixel value and the second pixel value to configure the virtual frame.

9. The projection system according to claim 1, wherein the projection device projects a correction pattern on the detection area, wherein the processing device detects the correction pattern through the imaging capturing device to obtain position information corresponding to the projection area, and configures the virtual frame according to the position information.

10. The projection system according to claim 3, wherein the virtual frame comprises a plurality of regions of interest surrounding the projected image, wherein the plurality of regions of interest comprise the first region of interest and the second region of interest adjacent to the first region of interest.

11. The projection system according to claim 1, wherein the processing device detects the object to generate an object frame on the detection area in the captured image, and determines that the object enters the projection area in response to overlapping of the object frame and the virtual frame.

12. The projection system according to claim 11, wherein the object frame corresponds to a head portion of the object.

13. The projection system according to claim 1, wherein the processing device stops performing the protection operation in response to determining that the object leaves the projection area.

14. The projection system according to claim 13, wherein the projection device generates a monochromatic image in the projection area in response to performing the protection operation, wherein the processing device generates a second virtual frame on the captured projection area in the captured image, and compares pixel values of the second virtual frame to determine whether the object leaves the projection area.

15. The projection system according to claim 14, wherein the second virtual frame comprises a first region of interest and a second region of interest, wherein the processing device compares a first pixel value of the first region of interest with a second pixel value of the second region of interest to generate a comparison result, and determines whether the object leaves the projection area according to the comparison result.

16. A control method of a projection system, wherein the projection system comprises a projection device, an image capturing device and a processing device, the control method comprising:

projecting a projected image on a projection area by the projection device;

capturing the projected image in a detection area by the image capturing device to generate a captured image, wherein the detection area comprises the projection area;

receiving the captured image, and generating a virtual frame around a captured projection area in the captured image, and analyzing pixel values of the virtual frame to determine whether an object enters the projection area by the processing device; and controlling the projection device to perform a protection operation by the processing device in response to determining that the object enters the projection area.

17. The control method according to claim 16, wherein the protection operation comprises at least one of: stopping projecting the projected image, reducing a brightness of the projected image, moving the projected image, scaling down the projected image, and pausing the projected image.

* * * * *